Figure 1:
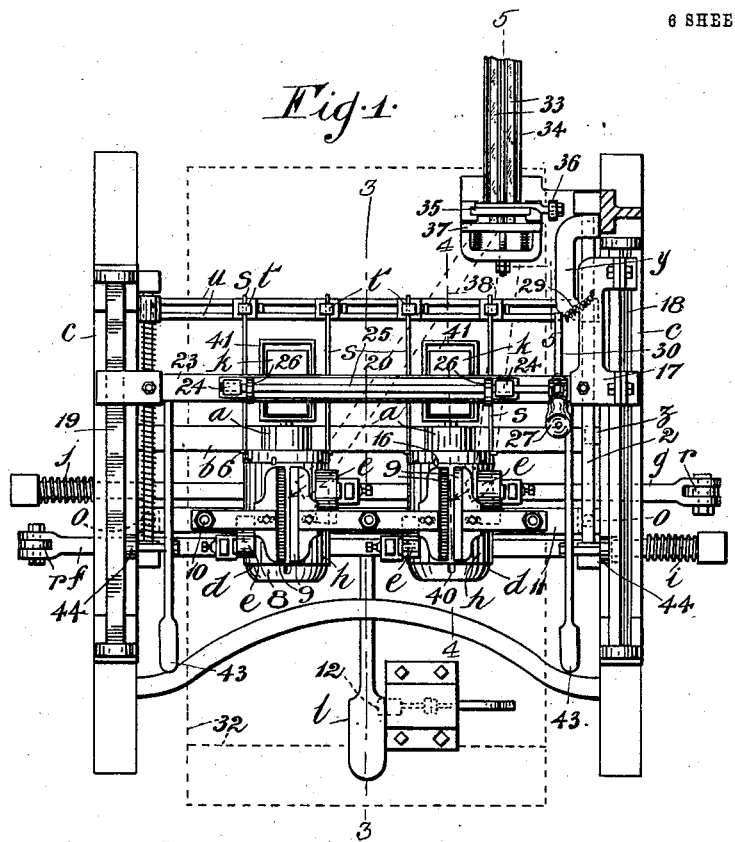

No. 724,785. PATENTED APR. 7, 1903.
G. W. BERRY.
APPARATUS FOR SOLDERING OR JOINING THE SEAMS OF CAN BODIES.
APPLICATION FILED MAR. 20, 1902.
NO MODEL. 6 SHEETS—SHEET 2.

Fig. 2.

No. 724,785. PATENTED APR. 7, 1903.
G. W. BERRY.
APPARATUS FOR SOLDERING OR JOINING THE SEAMS OF CAN BODIES.
APPLICATION FILED MAR. 20, 1902.
NO MODEL. 6 SHEETS—SHEET 3.
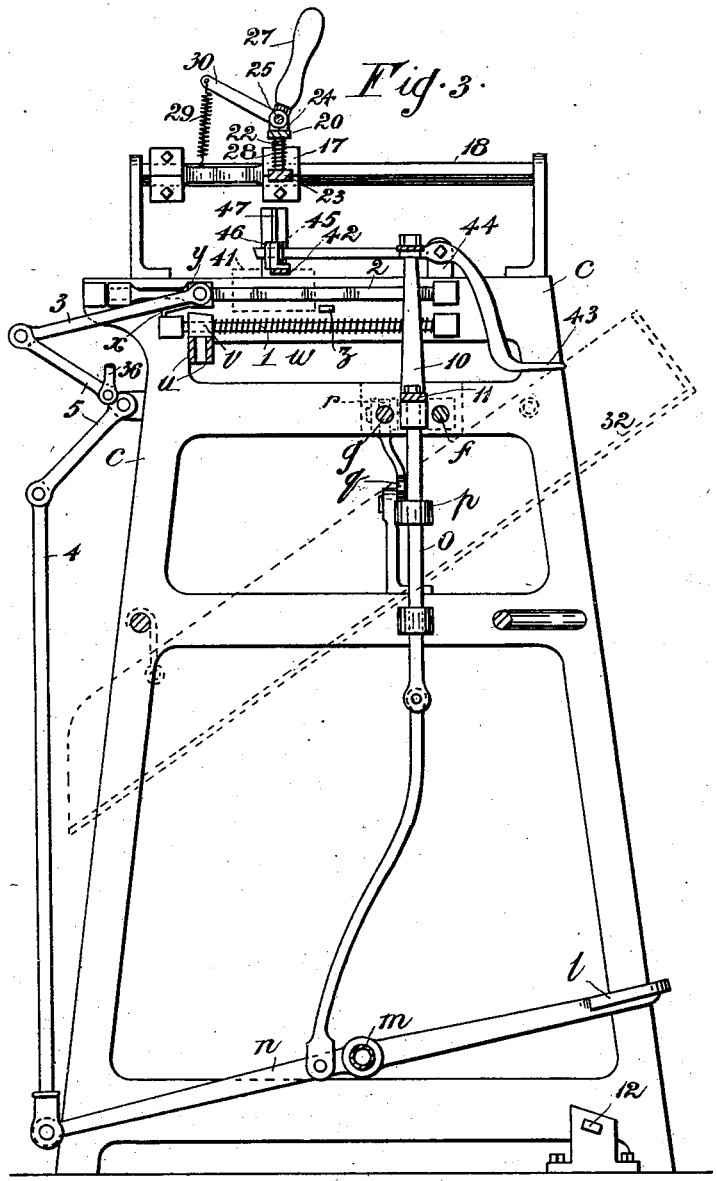

No. 724,785. PATENTED APR. 7, 1903.
G. W. BERRY.
APPARATUS FOR SOLDERING OR JOINING THE SEAMS OF CAN BODIES.
APPLICATION FILED MAR. 20, 1902.
NO MODEL. 6 SHEETS—SHEET 4.
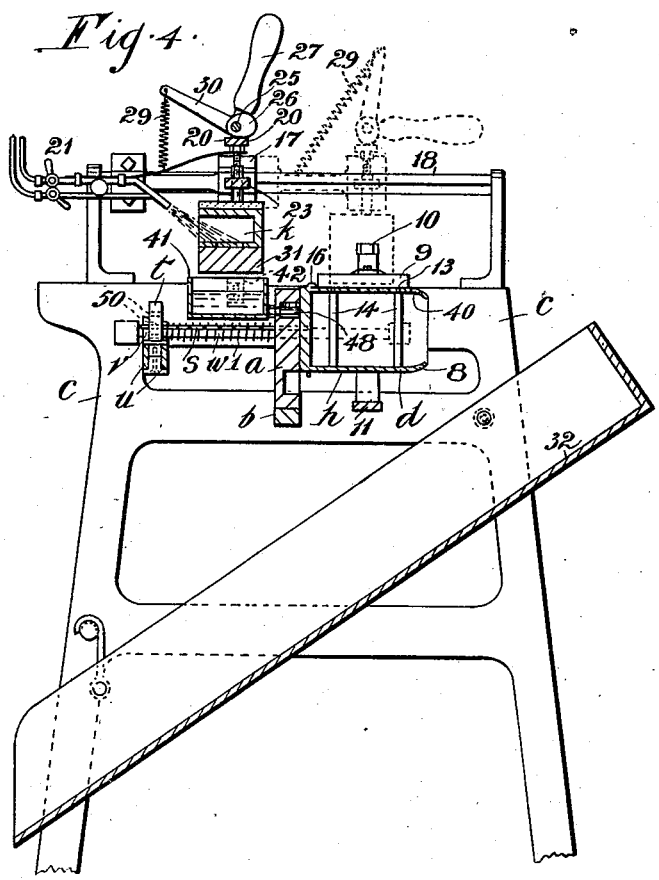

No. 724,785. PATENTED APR. 7, 1903.
G. W. BERRY.
APPARATUS FOR SOLDERING OR JOINING THE SEAMS OF CAN BODIES.
APPLICATION FILED MAR. 20, 1902.
NO MODEL. 6 SHEETS—SHEET 5.
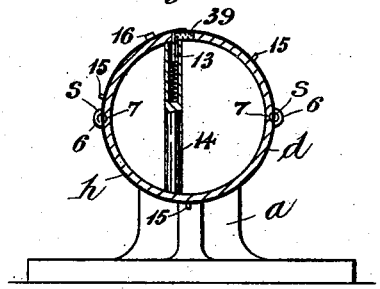
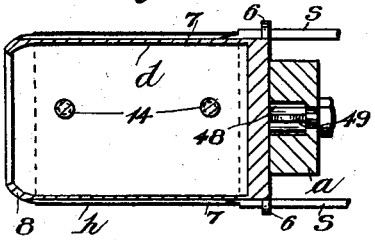
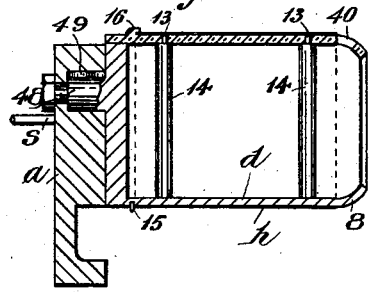
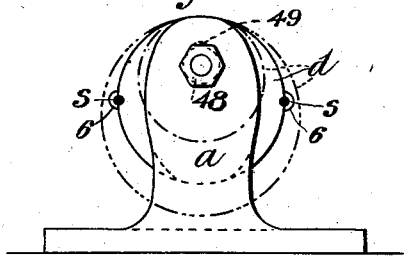
Witnesses
William Herbert Waters
Walker Charles Hart
Inventor
George William Berry
by
Edw Waters + Son
Attorneys No. 724,785. PATENTED APR. 7, 1903.
G. W. BERRY.
APPARATUS FOR SOLDERING OR JOINING THE SEAMS OF CAN BODIES.
APPLICATION FILED MAR. 20, 1902.
NO MODEL. 6 SHEETS—SHEET 6.
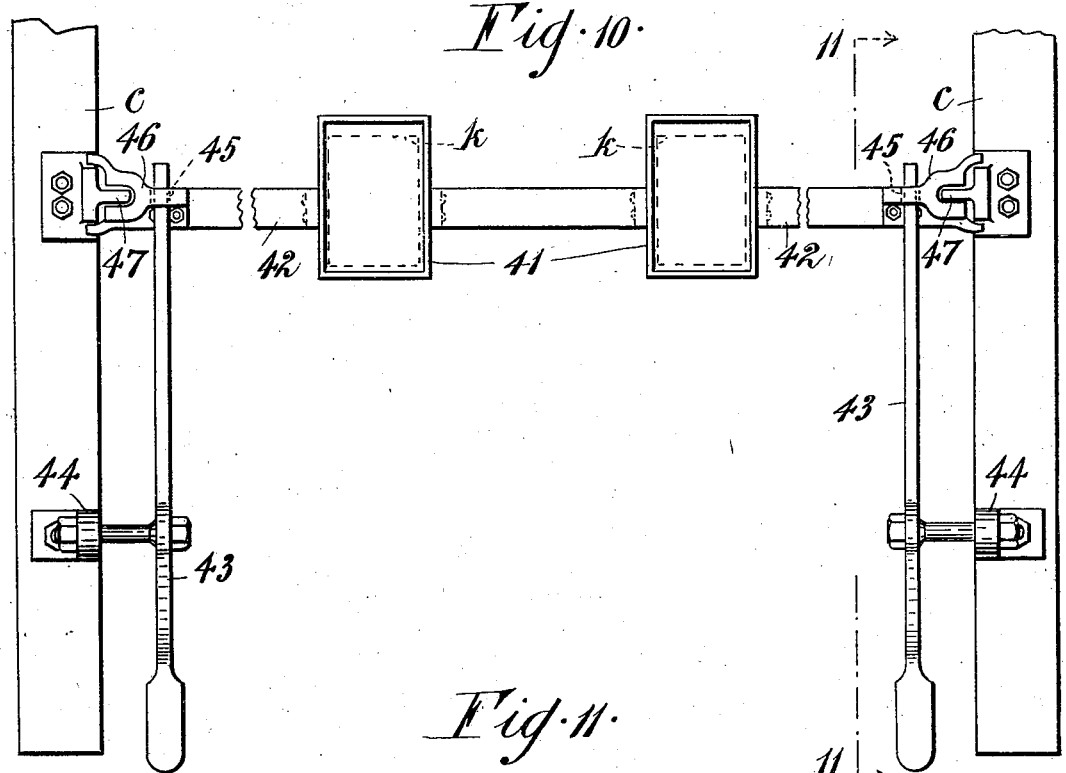
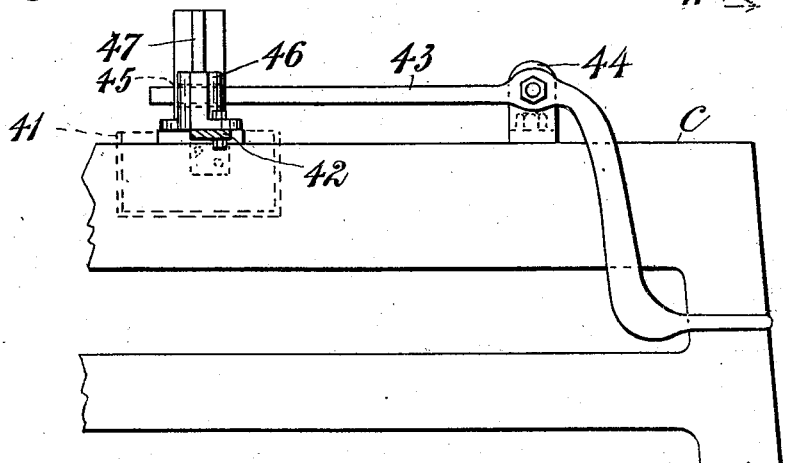

UNITED STATES PATENT OFFICE.

GEORGE WILLIAM BERRY, OF ALBERT PARK, NEAR MELBOURNE, VICTORIA, AUSTRALIA.

APPARATUS FOR SOLDERING OR JOINING THE SEAMS OF CAN-BODIES.

SPECIFICATION forming part of Letters Patent No. 724,785, dated April 7, 1903.

Application filed March 20, 1902. Serial No. 99,160. (No model.)

*To all whom it may concern:*

Be it known that I, GEORGE WILLIAM BERRY, tinsmith, a subject of the King of Great Britain, residing at No. 99 Merton street, Albert Park, near Melbourne, in the State of Victoria, Commonwealth of Australia, have invented certain new and useful Improved Apparatus for Soldering or Joining the Seams of Can-Bodies, of which the following is a specification.

The object of my invention is to provide mechanical means for soldering or joining the seams of can-bodies of various sizes in a more expeditious and neater manner than heretofore and with less material.

Having reference to the annexed sheets of drawings explanatory of my invention, Figure 1 is a plan, and Fig. 2 a front elevation, of my apparatus. Fig. 3 is a vertical transverse section on the line 3 3 of Fig. 1 with parts omitted for the sake of clearness. Figs. 4 and 5 are fragmentary vertical transverse sections on the lines 4 4 and 5 5, respectively, of Fig. 1, illustrating the parts not shown in Fig. 3. Figs. 6, 7, 8, and 9 are enlarged detail drawings showing the can-bodies in position when ready to be soldered. Fig. 10 is an enlarged plan view of the mechanism for cleaning the soldering-irons, and Fig. 11 is a vertical section on line 11 11 of Fig. 10.

The apparatus may be actuated entirely by motive power on a large scale; but with small apparatus, such as that illustrated, the hands and feet of the operator may be employed.

Upon upright brackets $a$ on a horizontal bar $b$, extending from vertical side supports $c$, constituting the main frame, are arranged any desired number of cylinders $d$ of the diameter of the can-bodies to be soldered, and on either side of said cylinders movable curved spring clamps or grips $e$, adjustably mounted at $e'$ on a pair of transverse parallel bars $f g$, are provided so as to be capable of gripping the partially-formed can-bodies $h$ onto said cylinders $d$ and holding the same by means of the coiled springs $i j$ on the ends of said bars $f g$ while the soldering-iron $k$ is run over the adjacent edges and then freeing the same when they are automatically thrown off or pushed forwardly by wire ejectors $s$ from the rear. A pedal $l$ is mounted on a rock-shaft $m$, from which extend lever-arms $n$. On said lever-arms are pivoted vertically-sliding rods $o$, having projections $p$, adapted to engage with and raise the arms $q$ of bell-crank levers mounted upon brackets on the side supports $c$. The other arms $r$ of the levers are pivotally connected to the bars $f$ and $g$ at the opposite ends to which the springs $i j$ are attached, said bars sliding laterally in the side frames $c$ under the influence of said springs to release the grips $e$ from the can-bodies when the pedal $l$ is depressed.

The wire ejectors $s$, which throw off the soldered can-bodies, are mounted in small standards $t$ on a pair of reciprocating bars $u$, attached to or made integral with blocks $v$, one of which is adapted to be drawn forward along a guide-rail $w$ by a spring-hook $x$ on a traveler $y$ when the pedal $l$ is depressed.

At the end of the forward movement of the traveler $y$ the spring-hook $x$ comes in contact with a lug $z$, projecting laterally from the side support $c$, which disengages it from the block $v$, when the reciprocating bars $u$, carrying the ejectors $s$, are returned to their rearward position by the power of the coiled spring 1, surrounding the guide-rail $w$, which spring was compressed by the forward movement just described.

The reciprocating traveler $y$ is propelled forward along its guide-rail 2 by the arms 3 and 4, pivotally connected to a bell-crank lever 5, mounted on the side supports, the whole deriving its motion from the pedal $l$, as illustrated in Fig. 3. When the next can-body is in position and a spring trip-catch 12, hereinafter referred to, is released, the traveler $y$ returns rearwardly and the spring-catch $x$, contacting with the beveled top of the block $v$, slides up and eventually slips over the end of it, ready for the next forward movement for ejecting the soldered can-bodies.

The forward ends of the ejector-wires $s$ pass through guide-lugs 6 and along grooves 7 on the cylinders, and their ends are formed, as shown, to enable them to get partially between the can-bodies and the cylinder, as illustrated in Figs. 6 and 7.

The bent metal blanks to form the can-bodies are slid onto the cylinders from the front, said cylinders being slightly curved inwardly at the front, as illustrated at 8, Figs. 4, 7, and 8, to facilitate this and the adjacent edges being arranged to come on top (see Fig. 6) between pairs of inclined guide-plates 9, arranged longitudinally of the cylinders and preferably made of aluminium to prevent the metal adhering. Said guide-plates 9 are adjustably mounted upon pillars 10 on a horizontal bar 11, which is secured to the upper end of the rod $o$ and so raised by the pedal at the same time as the grips $e$ are freed, thus permitting the next pair of can-bodies to be pushed onto the cylinders, said guide-plates being lowered when they are on by releasing the spring trip-catch 12, which holds the pedal down until the can-bodies are in position.

In order that the adjacent edges of the can-body may always fit in position between the guide-plates 9 without any particular care, two spring lugs or pins 13 project through each cylinder, so that the under edge of the can-body abuts against them until said guide-plates 9 are lowered, when they are pushed down into tubes 14 in the cylinder out of the way. The cylinders have also projecting stop-pins 15, against which the ends of the can-bodies abut, and a hook 16 to temporarily keep them down on the cylinders until the guide-plates are lowered.

Above the cylinders is a horizontally-reciprocating carrier 17, running on guide-rods 18 19 on each side of the upper portion of the aforementioned main frame $c$. This reciprocating carrier 17 has a vertically-moving parallel bar 20, which supports the soldering and hollow heating irons $k$, supplied with gas through flexible connections 21, said bar being kept in place by upwardly-projecting pins 22 on the reciprocating frame 23, while the amount of vertical play is regulated by adjustment bolts or stops 51 on said carrier, as illustrated in Fig. 2.

In the heads 24 of the upwardly-projecting pins 22, forming the bearings, is mounted a spindle 25, upon which are secured cams 26, adapted to depress the bar 20, carrying the soldering-irons, when the handle 27 is turned downwardly, as shown in dotted lines in Fig. 4.

When the soldering operation is completed, the carrier is pushed back, and springs 28 on the pins 22, with the assistance, if necessary, of the spring 29, attached at one end to an arm 30 of the handle, raise the irons to the position shown in full lines in Fig. 4.

The points 31 of the iron are of mild steel dovetailed into the hollow cast-steel body, as illustrated in Fig. 2, so that in the event of wearing they can be readily replaced.

The space between the guides or molds 9 determines the width of the seam, each of said inclined guides being made laterally adjustable, as shown in Figs. 1 and 2, for the purpose.

The lumps of solder may be fed by hand, having been previously cut to the desired size, or bars of solder 33 (one for each cylinder) may be arranged on an inclined tray 34 at the rear, while a cutter 35, attached to one of the lever-arms 5 by a connecting-rod 36, as illustrated in Figs. 1, 2, and 5, and operating at the same time as the guides are depressed, serves to cut off the requisite amount, (determined by an adjustable spring stop-piece 37,) and said lumps fall by gravity along chutes 38 onto said guides.

At each of the cylinders where the adjacent edges of the can-body meet small strips of aluminium 39 (see Fig. 6) are let into the surface, so that in the event of the solder sweating over the ends of the can-body it will prevent the latter from adhering to the cylinder. Holes 40 are also provided at the forward end of cylinders, so that any solder that may run off the cans will be caught in the cylinders.

The irons are cleaned by weak acid contained in vessels 41, secured to arms 42, adapted to be raised up to said irons when in their rearward position by means of hand-levers 43, pivoted to brackets 44 on the side support $c$. The rear ends of said levers engage in openings 45 in brackets 46 on said arms 42, and said brackets are adapted to slide vertically on guide-rails 47 on the side support $c$ when the forward ends of the levers are depressed, all as shown more clearly in Figs. 10 and 11.

As previously stated, the apparatus can be readily adjusted to suit the manufacture of different-sized can-bodies by substituting varying-sized cylinders having a lug 48 with a feather 49, which can be readily inserted in a corresponding hole in the bracket $a$ and tightened up by a nut. The curved spring clamps or grips $e$ are slid laterally on the bars $f$ and $g$, and when adjusted are secured by set-nuts, (shown in the drawings,) while the ejectors $s$ are withdrawn and clamped by set-nuts in one of the holes 50, Fig. 4, in the short standards $t$, said standards being adapted to slide laterally between the bars $u$ for this purpose.

Fig. 9 is a rear elevation of the bracket $a$ and shows in dotted lines the positions of a smaller and larger cylinder upon it, while Figs. 1, 4, 6, 7, 8, and 9 generally illustrate the means of adjustment.

Although the apparatus is shown in the drawings as adapted to solder or join the seams of two can-bodies at a time, it will be obvious that with the multiplication of the operating parts any number of can-bodies may be seamed at each cycle of operations.

The sequence of operations is as follows: The partially formed or bent metal blanks to form the can-bodies $h$ are slid onto the cylinders $d$ from the front with the meeting edges uppermost, as illustrated in Fig. 6, the lower edges abutting against the spring-lugs 13, projecting through the cylinder. Then by releasing a spring trip-catch 12, holding the pedal $l$, (or otherwise,) the clamps $e$ are caused to grip the partially-formed can-bodies onto said cylinders and the guides 9 lowered, while the ejector-wires s are drawn back and retained in their rearward position. The irons k having been duly heated and the adjacent edges of the can-bodies moistened with a suitable flux, a lump of solder sufficient for the joint to be made is dropped between the guides 9, the vertically-moving bar 20 and the irons which it carries are depressed, and the movable carrier 17 then drawn forward horizontally by the handle 27, (or otherwise,) thereby causing the adjacent edges of the partially-formed can-bodies to be soldered by the passage of the irons. This step may be repeated, if necessary. Finally, by depressing the pedal l (or otherwise) the guide-plates are raised and side clamps e released, while the ejector-wires s are drawn forward, so as to cast or throw the joined can-body off the cylinder onto an inclined chute 32, down which it runs into any convenient receptacle, said ejector-wires being returned ready for the next operation.

Having now particularly described and ascertained the nature of my said invention and in what manner the same is to be performed, I declare that what I claim is—

1. Apparatus for soldering or joining seams of can-bodies, comprising a cylinder of the diameter of the can-bodies suitably mounted on the frame of the machine in combination with curved spring-clamps slidably mounted to move toward and from said cylinder, and means for causing said clamps to grip the can-body externally and hold it about the cylinder and then release the same, substantially as set forth.

2. Apparatus for soldering or joining the seams of can-bodies, comprising a cylinder of the diameter of the can-bodies suitably mounted on the frame of the machine, a pair of bars slidably mounted in the frame, a clamp carried by each of said bars, said clamps being located, respectively, on opposite sides of said cylinder, a coil-spring fitted to each of said bars and operating to hold the clamps in normal engagement with a can-body inserted on said cylinder, and means for moving said bars to draw the clamps away from the can-body.

3. In apparatus for soldering or joining the seams of can-bodies, ejector mechanism consisting of levers operating a reciprocating traveler having a spring-hook in combination with an inclined sliding block on a guide-rail, a releasing-lug and a returning-spring coiled around the guide-rail substantially as set forth.

4. In apparatus for soldering or joining the seams of can-bodies a pair of ejector-wires mounted adjustably in short standards between a pair of transverse bars, blocks thereon, guide-rails for said blocks and a coiled returning-spring in combination with a lever-operated traveler having a spring-hook, guide-rails therefor, and a rigid releasing-lug substantially as set forth.

5. In apparatus for soldering or joining the seams of can-bodies, a pair of laterally-adjustable and vertically-moving inclined aluminium guide-plates mounted on pillars on a horizontal bar connected to a vertically-sliding rod substantially as set forth.

6. In apparatus for soldering or joining the seams of can-bodies, a horizontally-reciprocating carrier supporting a vertically-moving parallel bar, heating-irons depending from said bar and working in said carrier, and means for guiding, depressing and raising said bar, substantially as set forth.

7. In apparatus for soldering or joining the seams of can-bodies the combination with a horizontally-reciprocating carrier of a parallel bar supporting the heating-irons and moving vertically upon upwardly-projecting guide-pins thereon, adjustment bolts or stops to regulate the amount of vertical play, cams on a spindle operated by a crank to depress said parallel bar and springs for raising same substantially as set forth.

8. In apparatus for soldering or joining the seams of can-bodies, the combination with an inclined tray adapted to contain a bar of solder, of a cutter coöperating with said tray, vertically-movable guide-plates for clamping the can-bodies adjacent to the seams, mechanism for raising and lowering said guide-plates, means operatively connecting said mechanism with said cutter, whereby the latter will be actuated to cut the solder as the guide-plates are depressed, and a chute leading from said tray to said guide-plates for conveying the cut solder thereto, substantially as set forth.

9. In apparatus for soldering or joining the seams of can-bodies, a cylinder having a curved outer edge and provided in its upper side with a hole through which the excess solder may run, substantially as set forth.

10. In apparatus for soldering or joining the seams of can-bodies, in combination with a longitudinally-movable carriage supporting a vertically-movable, depending soldering-iron, a vessel for containing acid mounted to move in vertical guides, and lever mechanism for raising and lowering said vessel, substantially as described.

In testimony whereof I have hereunto set my hand in presence of two subscribing witnesses.

GEORGE WILLIAM BERRY.

Witnesses:
EDWARD WATERS,
EDWARD WATERS, Jr.